United States Patent
Kreibe

(10) Patent No.: US 8,176,074 B2
(45) Date of Patent: May 8, 2012

(54) METHODS AND SYSTEMS FOR QUERYING A TAG DATABASE

(75) Inventor: Martin Kreibe, Wilmington, DE (US)

(73) Assignee: SAP AG, Walldorf (DE)

( * ) Notice: Subject to any disclaimer, the term of this patent is extended or adjusted under 35 U.S.C. 154(b) by 283 days.

(21) Appl. No.: 12/607,132

(22) Filed: Oct. 28, 2009

(65) Prior Publication Data

US 2011/0099190 A1    Apr. 28, 2011

(51) Int. Cl.
G06F 17/30 (2006.01)
(52) U.S. Cl. .......... 707/769; 707/802
(58) Field of Classification Search .......... 707/705, 707/999.003, 769, 802
See application file for complete search history.

(56) References Cited

U.S. PATENT DOCUMENTS

| | | | | |
|---|---|---|---|---|
| 5,966,711 A * | 10/1999 | Adams | | 1/1 |
| 6,480,108 B2 * | 11/2002 | McDonald | | 340/505 |
| 6,934,712 B2 * | 8/2005 | Kiernan et al. | | 1/1 |
| 7,287,029 B1 * | 10/2007 | Craft et al. | | 1/1 |
| 7,370,040 B1 * | 5/2008 | Kruy et al. | | 1/1 |
| 7,526,490 B2 * | 4/2009 | Doughan | | 1/1 |
| 7,617,190 B2 * | 11/2009 | Wright et al. | | 1/1 |
| 7,860,838 B2 * | 12/2010 | Gupta et al. | | 707/651 |
| 7,961,946 B2 * | 6/2011 | Hammadou | | 382/181 |
| 2002/0062381 A1 * | 5/2002 | Gargiulo et al. | | 709/228 |
| 2002/0091696 A1 * | 7/2002 | Craft et al. | | 707/10 |
| 2003/0061378 A1 * | 3/2003 | Mazzitelli | | 709/238 |
| 2003/0140036 A1 * | 7/2003 | Belowsov | | 707/3 |
| 2004/0054691 A1 * | 3/2004 | Sharma et al. | | 707/104.1 |
| 2004/0162814 A1 * | 8/2004 | Bergholz et al. | | 707/3 |
| 2004/0236724 A1 * | 11/2004 | Chien et al. | | 707/3 |
| 2005/0086216 A1 * | 4/2005 | Davis | | 707/3 |
| 2005/0160076 A1 * | 7/2005 | Kanemasa | | 707/2 |
| 2005/0256852 A1 * | 11/2005 | McNall et al. | | 707/3 |
| 2005/0280540 A1 * | 12/2005 | Muehl et al. | | 340/572.4 |
| 2006/0161514 A1 * | 7/2006 | Nelson et al. | | 707/1 |
| 2006/0277309 A1 * | 12/2006 | Eaton | | 709/227 |
| 2006/0279538 A1 * | 12/2006 | Chang et al. | | 345/156 |
| 2007/0219959 A1 * | 9/2007 | Kanemasa | | 707/3 |
| 2007/0288424 A1 * | 12/2007 | Neil | | 707/2 |
| 2008/0134286 A1 * | 6/2008 | Amdur et al. | | 726/1 |
| 2008/0215641 A1 * | 9/2008 | Mukhi | | 707/204 |
| 2009/0006447 A1 * | 1/2009 | Balmin et al. | | 707/102 |
| 2009/0089334 A1 * | 4/2009 | Mohamed et al. | | 707/200 |
| 2009/0171992 A1 * | 7/2009 | Roberts | | 707/100 |
| 2009/0177637 A1 * | 7/2009 | Hollebeek | | 707/3 |
| 2009/0198648 A1 * | 8/2009 | Middleton et al. | | 707/3 |
| 2009/0319496 A1 * | 12/2009 | Warren et al. | | 707/4 |
| 2010/0191732 A1 * | 7/2010 | Lowe et al. | | 707/737 |

OTHER PUBLICATIONS

Bergholz et al., "Using Quey Probing to Identify Quey Language Features on the Web", In the Proceeding of Distributed Multimedia Information Retrieval, 2003, 10 pages.*

* cited by examiner

Primary Examiner — Phuong Thao Cao
(74) Attorney, Agent, or Firm — Finnegan, Henderson, Farabow, Garrett & Dunner, LLP

(57) ABSTRACT

Methods and systems are provided for querying a tag database. The tag database is stored in a storage. An XML document including a database query is received. The database query is written in a query language supported by an agent of the tag database. The XML document is parsed to extract the database query from the XML document. The tag database is accessed to perform at least one or a read or write operation on the tag database, based on the database query.

19 Claims, 3 Drawing Sheets

METHODS AND SYSTEMS FOR QUERYING A TAG DATABASE

BACKGROUND

1. Technical Field

The present disclosure generally relates to querying databases. More particularly, and without limitation, the present disclosure relates to methods and systems for using a unified query language to query tag databases.

2. Related Art

A special type of databases called "tag databases" store various information including tags. A "tag" may be any piece of data, for example, a numerical value representing the size of a part in a manufacturing process. Using a conventional query language (e.g., SQL) to query a tag database has many disadvantages. For example, a conventional query language may not be temporal. That is, a conventional query language may not permit querying historical information and working with data that varies over time (i.e., time-dependent values). Furthermore, a conventional query language may not allow for feature discovery. Therefore, a user, an application, or a system may not be able to discover features, supported commands, and preset defaults from the database, but rather must resort to printed manuals, help files, etc. In addition, a conventional query language may not allow for "extensibility hooks." That is, a convention query language may not permit adding or customizing commands and features. Moreover, a conventional query language can be very slow when operating with tag databases having large amounts of data. These and other disadvantages of a conventional query language create a need for an improved and uniform query language that supports tag databases more efficiently.

SUMMARY

Disclosed embodiments include methods and systems for querying a tag database using a query language.

Consistent with a disclosed embodiment, a computer-implemented method is provided for querying a tag database. The method may comprise storing the tag database in a storage. The method may further comprise receiving an XML document including a database query written in a query language supported by an agent of the tag database. The method may further comprise parsing the XML document to extract the database query from the XML document. The method may further comprise accessing, using a processor, the tag database to perform at least one of a read or write operation on the tag database, based on the database query.

Consistent with another disclosed embodiment, a system is provided for querying a tag database. The system may comprise a storage for storing the tag database. The system may further comprise a processor for executing an agent. The agent may receive an XML document including a database query written in a query language supported by the agent. The agent may parse the XML document to extract the database query from the XML document. The agent may access the tag database to perform at least one of a read or write operation on the tag database, based on the database query.

Consistent with yet another disclosed embodiment, a computer-readable storage medium is provided that includes instructions executable by a processor for implementing a method for querying a tag database. The method may comprise storing the tag database in a storage. The method may further comprise receiving an XML document including a database query written in a query language supported by an agent of the tag database. The method may further comprise parsing the XML document to extract the database query from the XML document. The method may further comprise accessing, using the processor, the tag database to perform at least one of a read or write operation on the tag database, based on the database query.

It is to be understood that both the foregoing general description and the following detailed description are exemplary and explanatory only and are not restrictive of the invention, as claimed.

The accompanying drawings, which are incorporated in and constitute a part of this specification, illustrate one or several embodiments of the invention and together with the description, serve to explain the principles of the invention.

BRIEF DESCRIPTION OF THE DRAWINGS

The accompanying drawings, which are incorporated in and constitute a part of this specification, illustrate various disclosed embodiments.

DETAILED DESCRIPTION

Figure 1:
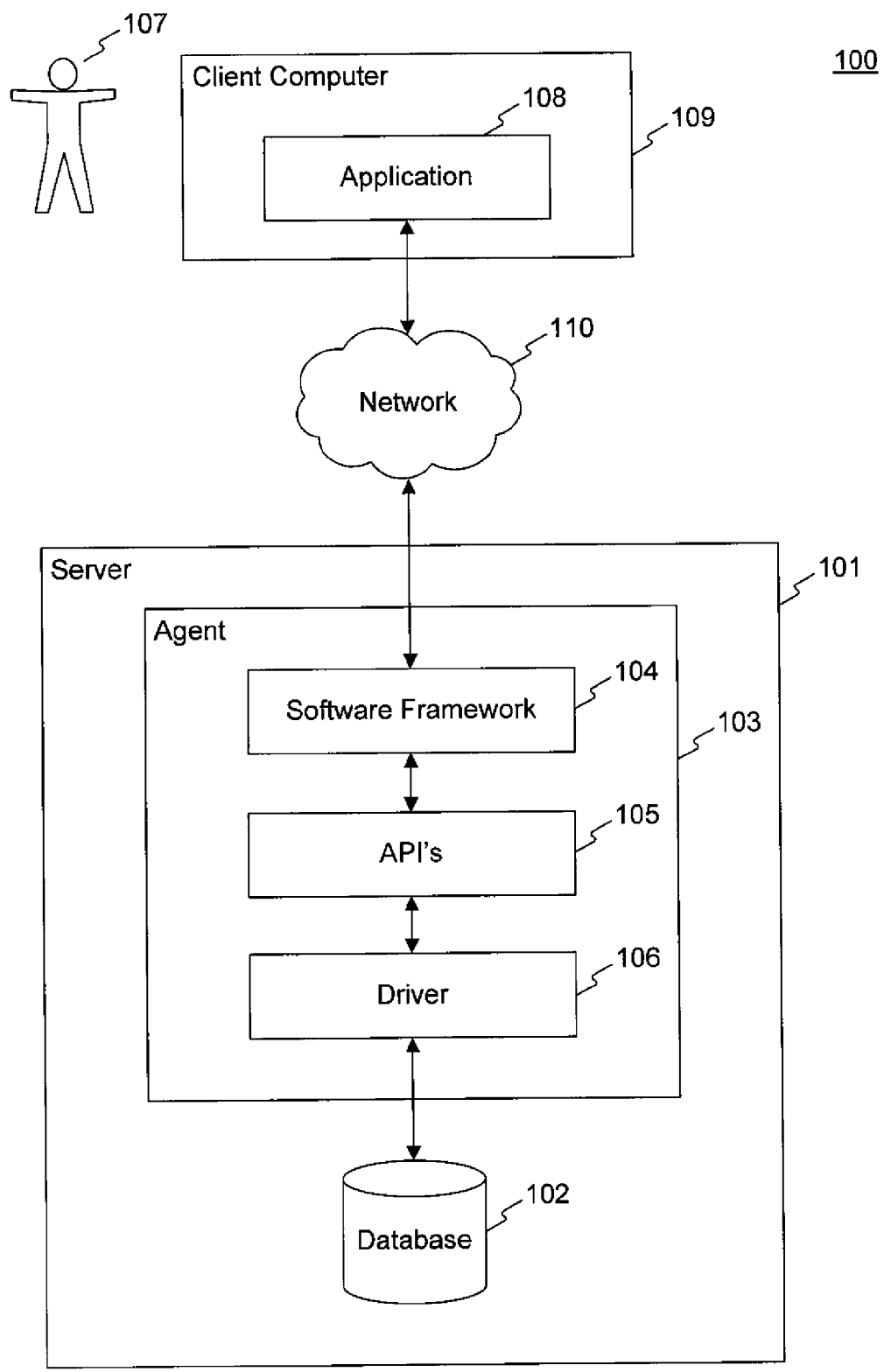
FIG. 1 illustrates an exemplary query architecture, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, removing, or adding steps to the disclosed methods. Accordingly, the following detailed description is not limiting of the disclosed embodiments. Instead, the proper scope is defined by the appended claims.

FIG. 1 illustrates an exemplary query architecture 100, consistent with a disclosed embodiment. Query architecture 100 may include a server 101. Server 101 may be any type of computer or electronic device for storing and processing data. Server 101 may store a database 102. Database 102 may be any collection of information arranged in a logical manner such that the stored information can be retrieved, updated, and deleted. Database 102 may be a tag database storing one or more tags. A tag may be any information in database 102. For example, a tag may be a numerical value representing a characteristic of a component in a manufacturing process.

Furthermore, server 101 may include an agent 103. Agent 103 may be an application that implements the query functionality disclosed in detail below. Agent 103 may include a software framework 104 for receiving queries from an application 108. Agent 103 may support one or more specific query languages for accessing database 102. Agent 103 may further include one or more application program interfaces (APIs) 105 capable of accessing database 102. Agent 103 may further include a driver 106 for providing access to database 102.

In one embodiment, a user 107 may use an application 108 running on a client computer 109 to send database queries to agent 103 of database 102. Client computer 109 may be connected to server 101 via a network 110, such as an intranet, extranet, local area network (LAN), wide area network (WAN), or the Internet.

Figure 2:
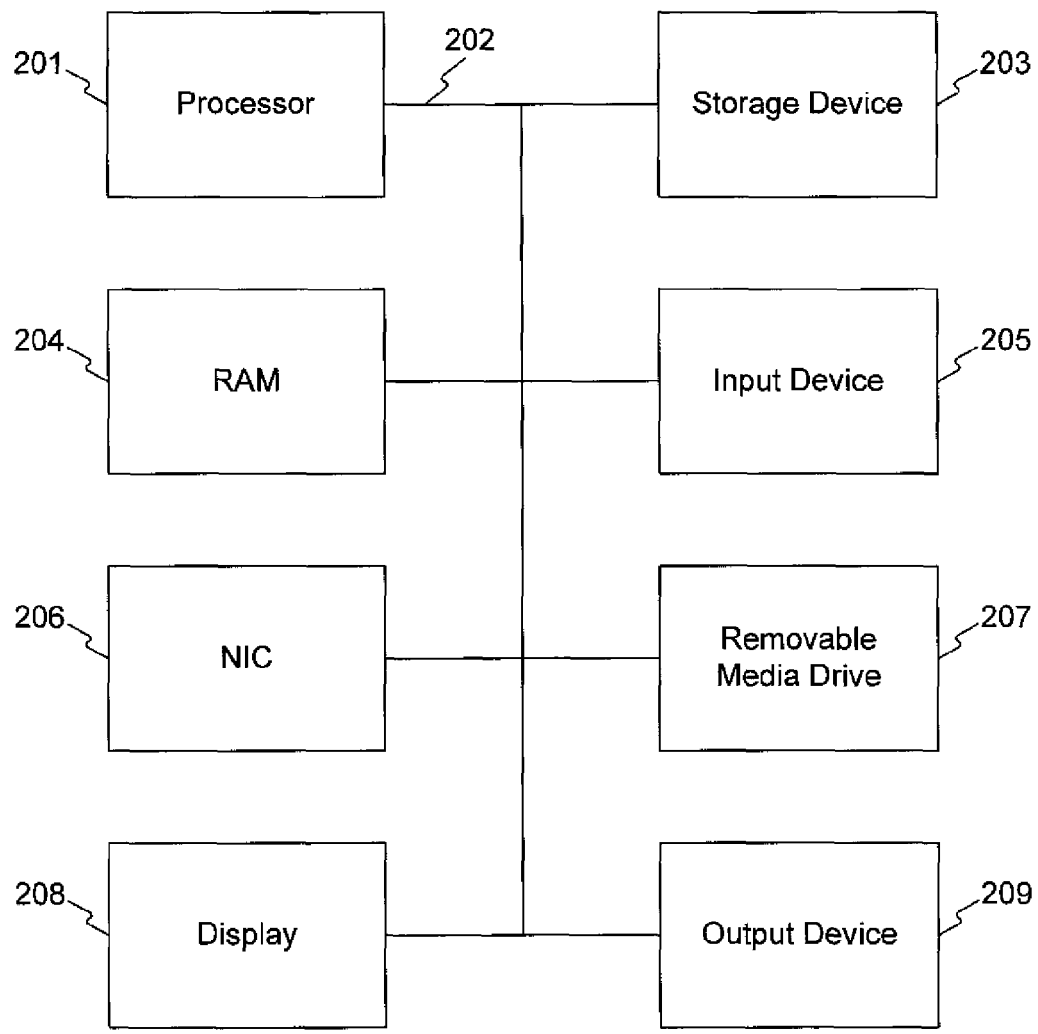
FIG. 2 illustrates an exemplary computer system, consistent with a disclosed embodiment.

FIG. 2 illustrates an exemplary computer system 200, consistent with a disclosed embodiment. Computer system 200 may be representative of server 101 and/or client computer 109. Computer system 200 may include a processor 201 for executing instructions to perform processing related to querying database 102. Processor 201 may be connected to a data bus 202, which connects various components of computer system 200. Computer system 200 may include a storage device 203 for storing, for example, database 102 and other data. Computer system 200 may further include a random access memory (RAM) 204, which may be used by processor 201 as a placeholder for active data during the execution of instructions. Computer system 200 may also comprise one or more input devices 205, for example, a keyboard and/or a mouse. Computer system 200 may include a network interface controller 206, which enables computer system 200 to communicate over network 110. Computer system 200 may comprise a removable media drive 207, such as a floppy drive, CD-ROM, DVD-ROM, or USB flash drive, for loading computer-readable media.

Computer system 200 may also comprise a display 208, such as a monitor. Display 208 may be capable of displaying to user 107 a graphical user interface including, for example, the results of a database query. Computer system 200 may also comprise an output device 209, such as a printer or a fax machine. Program instructions for executing the exemplary methods and for implementing the exemplary systems for querying database 102 may be stored in storage device 203 or removable media drive 207, or may be received via network interface controller 206. These program instructions may be executed by processor 201.

Figure 3:
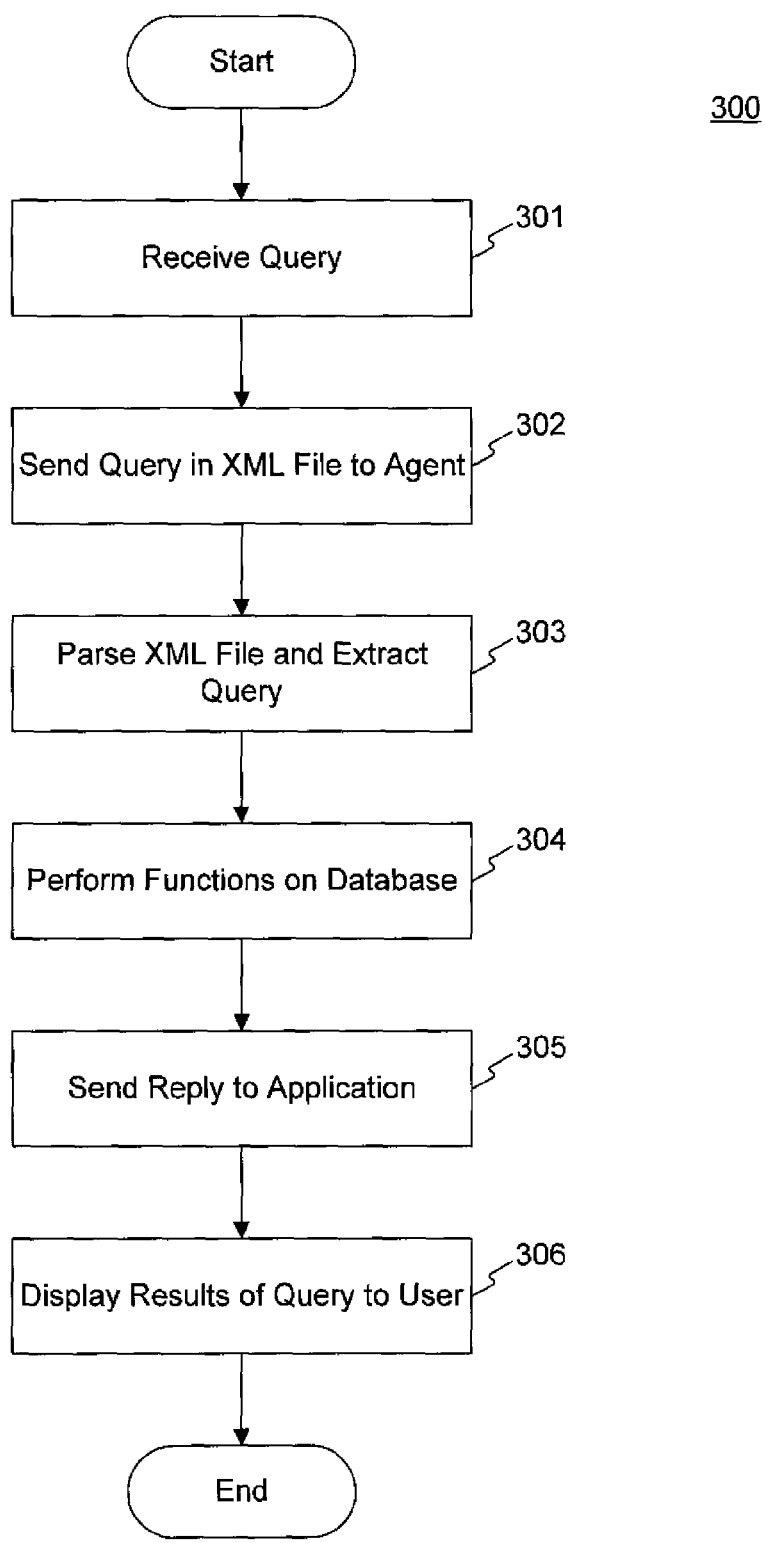
FIG. 3 is a flow chart of an exemplary method for querying a tag database, consistent with a disclosed embodiment.

FIG. 3 is a flow chart of an exemplary method 300 of querying tag database 102, consistent with a disclosed embodiment. In step 301, user 107 may input a query to application 108 using a query language supported by agent 103. In step 302, the query may be sent from application 108 to agent 103. In one embodiment, the query may be included in an eXtensible Markup Language (XML) file when sent from application 108 to agent 103. In step 303, agent 103 may parse the XML file to extract and read the query. Optionally, agent 103 may use an XML schema definition (XSD) document to validate that the input data in the XML file is in the correct format. If the format is incorrect, agent 103 may return an error message. In step 304, agent 103 may perform one or more functions on database 102 based on the query. In step 305, agent 103 may send a reply to application 108. The reply may include the results of the query. In step 306, the results of the query may be displayed on display 208 of client computer 109 to user 107.

As one of ordinary skill in the art will appreciate, one or more of blocks 301-306 may be optional and may be omitted from implementations in certain embodiments. Furthermore, functionality provided by one or more of blocks 301-306 may be subdivided into multiple blocks.

The results of the query may be displayed on display 208 of client computer 109 used by user 107 to run application 108. In one embodiment, user 107 may choose to view the results in one of three view types: current view, historical/event view, and interpolated view. In the current view, only the latest known point of data is displayed. For the current view, user 107 need not provide any time parameters. For the historical or event view, user 107 may provide a time range. The displayed results in the historical/event view will be the actual values of data at all available points within the provided time range. For the interpolated view, user 107 may provide a time range. The displayed results in the interpolated view will include values of data within the provided time range at predefined intervals and a curve fitted line that estimates the values between the intervals. If a time range is not provided by user 107 for the historical/event view or for the interpolated view, then a default time range will be used.

In one embodiment, agent 103 may support tag-based queries. Tag-based queries allow application 108 to execute requests that read current, historical, and statistical data values from database 102. In addition, the tag query functionality allows application 108 to execute requests that write current and historical data values to database 102. Furthermore, agent 103 may also support any known or legacy queries, such as SQL queries.

To facilitate efficient query execution, software framework 104 may implement a namespace cache to enable caching of group, tag, and property data from database 102. This data may be retrieved from database 102 and cached when agent 103 starts up so that the namespace data does not have to be looked up on each query request.

Furthermore, software framework 104 may allow user 107 to configure a namespace alias for agent 103. A namespace alias provides a locally defined representation for the namespace data (i.e., group, tag, and property data) of database 102. The namespace alias feature can greatly reduce the visual namespace data. For example, database 102 may have 100,000+ data items, but only 100 data items defined by an alias may be visible to application 108. In addition, the actual data name may be mapped to a different name, which may be required if the actual data name uses characters that are unsupported by application 108 or if the actual data name is not meaningful to user 107. An alias may be defined in using the XML format or a variant thereof.

Below disclosures include details regarding a new query language, consistent with disclosed embodiments. The below disclosed query language, commands, and features may be supported by application 108, agent 103, and database 102. Sample codes of the query language provided below are exemplary only, and the query language is not limited to the explicit examples provided.

The query language may enable the ability to query database 102, for example, to access tables and columns of data stored in database 102. In one embodiment, database requests may be divided into three categories: query, table listing, and column listing.

A query may be sent to agent 103 in the following exemplary XML file.

```
<?xml version="1.0" encoding="utf-8"?>
<pco:request xmlns:pco="uri:sap-pco-request" pco:version="1.0">
  <pco:database>
    <pco:query>
      <![CDATA[query]]>
    </pco:query>
  </pco:database>
</pco:request>
```

The reply from the above request may depend on the input query, agent 103, and data stored in database 102.

A listing of tables may be retrieve using the following exemplary XML file.

```
<?xml version="1.0" encoding="utf-8"?>
<pco:request xmlns:pco="uri:sap-pco-request" pco:version="1.0">
  <pco:database>
    <pco:tables pco:mask="mask" />
  </pco:database>
</pco:request>
```

The reply from the above request may be a single column listing of table names with the column header "Tables" and an attribute called "Count" indicating the number of tables in database 102.

Similar to the table listing query above, a column-listing query may be sent by the following exemplary XML file.

```
<?xml version="1.0" encoding="utf-8"?>
<pco:request xmlns:pco="uri:sap-pco-request" pco:version="1.0">
    <pco:database>
        <pco:columns pco:tables="table" pco:mask="mask" />
    </pco:database>
</pco:request>
```

A column-listing query requires a table name to scan and may optionally include a mask to narrow the potential output. The reply from the above request may be a single column list of table names with the column header "Columns," an attribute on that column called "Table" with the table name as the value, and an attribute called "Count" with the number of columns in the table.

A tag query may be sent by the following exemplary XML file.

```
<?xml version="1.0" encoding="utf-8"?>
<pco:request xmlns:pco="uri:sap-pco-request" pco:version="1.0">
    <pco:tag>
        <! [CDATA[label1:directive1;label2:directive2;]]>
    </pco:tag>
</pco:request>
```

In one embodiment, all tag queries may be implemented through a text-based language. The reply from the above query may depend on the input query.

The query language may also support text requests, where the querying systems are neither tag nor database systems. A text query may be sent using the following exemplary XML file.

```
<?xml version="1.0" encoding="utf-8"?>
<pco:request xmlns:pco="uri:sap-pco-request" pco:version="1.0">
    <pco:text>
        <! [CDATA[query]]>
    </pco:text>
</pco:request>
```

The reply from the above query may depend on agent 103.

The query language may also support feature requests. A feature request may return a list of features supported by agent 103. A feature query may be sent using the following exemplary XML file.

```
<?xml version="1.0" encoding="utf-8"?>
<pco:request xmlns:pco="uri:sap-pco-request" pco:version="1.0">
    <pco:features/>
</pco:request>
```

The reply from the above query may include, for example, three tables corresponding to three types of feature sets available.

The reply may include a database features table, indicating that the system supports database queries. The database features table may include two columns: one column for a list of database features and another column for indications of whether the database features are supported. An exemplary database feature response table is provided by Table 1 below.

TABLE 1

| Database Features | Supported |
| --- | --- |
| ColumnListingMask | True/False |
| TableListingMask | True/False |
| IsSQLBased | True/False |

The reply may include a tag features table, indicating that a tag query infrastructure is available in the system. The tag features table may indicate which tag query language directives are supported. An exemplary tag features response table is provide by Table 2 below.

TABLE 2

| Tag Features | Supported |
| --- | --- |
| Aggregates | True/False |
| Secondaries | True/False |
| Attributes | True/False |
| CustomFunctions | True/False |
| Groups | True/False |
| Retrieve | True/False |
| RegexMask | True/False |
| NativeMask | True/False |
| LegacyMask | True/False |
| Store | True/False |
| QueryPartitioning | True/False |
| NamespacingPartitioning | True/False |

The reply may include a text feature table, indicating that the system supports text queries. The text feature table may include the supported text features. In one embodiment, in which no text features are available, no rows may be returned in the text features response table, but the table headers may nonetheless be returned. An example of such a text features response table with only the headers and no rows for any text features is provided by Table 3 below.

TABLE 3

| Text Features | Supported |
| --- | --- |

The following describes several directives that may be supported by the query language, application 108, and agent 103 that can be used to access information from tag database 102.

The query language may support a RETRIEVE directive, which may return a set of data from tag database 102. In one embodiment, tag database 102 may store time-based tags having a single primary value and optionally one or more secondary values. Secondary values may further describe the data at a specific point in time. For example, a secondary value may be an accuracy reading or a signal quality indicator. Secondary values may change over the lifetime of the primary value and are thus usually stored alongside the primary value at the point in time at which the secondary values change. The RETRIEVE directive may be capable of retrieving both the primary value and the secondary value. The syntax for this directive may be as follows.

```
RETRIEVE {<mask> | <tag list₁>}
    [INCLUDE <secondaries>]
    [VIEW <view>]
    [METADATA <metadata>]
    [PARTITIONS(<partition parameters>)]
    [WHERE <limits>];
```

For example, the following query may return the values for the LineSpeed1 tag
RETRIEVE LineSpeed1;
The following query may return the primary value of the LineSpeed1 tag, the Quality secondary value for the LineSpeed1 tag, the primary value of LineSpeed2 tag, and the Quality secondary value for the LineSpeed2 tag.
RETRIEVE LineSpeed1, LineSpeed2 INCLUDE Quality;
The data source may support special views of the data including the interpolated view, described above. The following query may return interpolated values for the LineSpeed1 tag.
RETRIEVE LineSpeed1 VIEW INTERPOLATE;
The following query may return the values for the LineSpeed1 tag such that the returned table is limited to at most 100 rows, the values start at Jan. 1, 2008, at 1:00 AM, 5 hours behind UTC, and the query ends 60 minutes from the start time.
RETRIEVE LineSpeed1 WHERE RowCount=100, StartDate='2008-01-01T01:00:00-5:00', Duration=60;
The query language may support an AGGREGATE directive, which retrieves specialized aggregates from tag database 102. The syntax for this directive may be as follows.

```
AGGREGATE { <mask> | <tag list> } GET <aggregates>
    [INCLUDE <secondaries>]
    [METADATA <metadata>]
    [PARTITIONS(<partition parameters>)]
    [WHERE <limits>];
```

For example, the following query may return the minimum value and the maximum value for Tag1 tag that tag database 102 has for the last 60 minutes (the default duration), and the Units secondary values of Tag1 tags will also be returned as an additional column.
AGGREGATE Tag1 GET MIN, MAX INCLUDE Units;
The query language may support a CALL directive, which calls a custom operation or function on agent 103 to retrieve a specialized set of data. For example, a function that returns server information or server status may be called using the CALL directive. The syntax for this directive may be as follows.

```
CALL function name
    [(<function parameters>)]
    [WHERE <limits>];
```

For example, a custom function called "PrintValuesFrom" may be called using the CALL directive. The "PrintValuesFrom" function may print all values from the "Begin" value to the "End" value and limits the number of outputs to "RowCount." The following query may return a single list of 5, 4, 3, 2, 1, 0, −1.
CALL PrintValuesFrom(Begin=5, End=−4) WHERE RowCount=7;
For example, the following exemplary C# code may define a custom function (the details of the function have been excluded by a comment block) and its parameters, which may be called using the CALL directive.

```
[TagQuerySupport]
class TagAgent
{
    [TagCall("MethodName", new string[ ] { "Param1", "Param2" })]
    Table DoCustomMethod(Dictionary<string, string> parameters,
                        LimitCollection limits)
    {
        // Some custom method code.
        return null;
    }
}
```

The query language may support a PARTITION directive, which breaks up, or partitions, the result of the query into one or more fragments of a specified size. The PARTITION directive may be used when calling, for example, a LIST, RETRIEVE, or AGGREGATE directive. For example, the following query may return a list of all tags, but the results are returned in fragments of 50 items at a time in a table of 50 rows or less.
LIST TAGS PARTITION rows=50;
When the PARTITION directive is used, a session GUID, such as {936F99DD-ABA4-4b9a-9EBF-D6AA32916C8A}, may be returned so that additional fragments of the result of the query may be requested using the assigned session GUID.
The query language may support a CONTINUE directive. This directive may be called after calling, for example, a LIST, RETRIEVE, or AGGREGATE directive with a PARTITION directive. The CONTINUE directive may continue whichever directive (e.g., LIST, RETRIEVE, or AGGREGATE) that started the data retrieval and return the next fragment or the rest of the results. The syntax for this directive may be as follows.
CONTINUE DIRECTIVE session;
For example, the following query may continue returning data from the {936F99DD-ABA4-4b9a-9EBF-D6AA32916C8A} session.
CONTINUE DIRECTIVE '936F99DD-ABA4-4b9a-9EBF-D6AA32916C8A';
The query language may support a LIST DEFAULTS directive, which returns a list of defaults. The syntax for this directive may be as follows.

```
LIST DEFAULTS
    [PARTITIONS(<partition parameters>)]
    [WHERE <limits>];
```

For example, the following query may return a list of all the defaults.
LIST DEFAULTS;
The query language may support an OVERRIDE directive, which may override the defaults for a directive for the duration of the request. The syntax for this directive may be as follows.
OVERRIDE LIMIT <overrides>;
For example, the following query overrides the default values and sets the RowCount to 5 rows and the Duration to 120 minutes.
OVERRIDE LIMIT SET RowCount=5, SET Duration=120;
The query language may support a LIST METADATA directive, which returns a list of metadata that are in common for a collection of tags. The syntax for this directive may be as follows.

```
          LIST METADATA
              [FOR {<mask> | <tag list₂>}]
              [PARTITIONS(<partition parameters>)]
              [WHERE <limits>];
```

If the tags are not specified, then the set of all metadata or properties for all items in the namespace are returned. For example, the following query retrieve all the possible metadata the system can return.
LIST METADATA;
The following query retrieves the metadata for the Tag1 tag.
LIST METADATA FOR Tag1;

The query language may support a LIST FUNCTIONS directive, which may return a list of custom functions supported by agent 103. This directive may return a single-column table with function names as values in the table. The syntax for this directive may be as follows.

```
          LIST FUNCTIONS
              [PARTITIONS(<partition parameters>)]
              [WHERE <limits>];
```

For example, the following query may return all the functions supported by agent 103.
LIST FUNCTIONS;

The query language may support a LIST GROUPS directive, which may return all groups within a parent group. The result may be a two-column table including group names and relative paths from the previous path. The syntax for this directive may be as follows.

```
          LIST GROUPS
              [UNDER group]
              [PARTITIONS(<partition parameters>)]
              [WHERE <limits>];
```

For example, the following query may return a table of groups under the Group1 group.
LIST GROUPS UNDER Group1;
If the parent group is not provided, then all groups are returned.

The query language may support a LIST PARAMETERS directive, which may return all parameters for a particular function. The result may be a two-column table including parameter names and parameter types as strings. The syntax for this directive may be as follows.

```
          LIST PARAMETERS FOR function name
              [PARTITIONS(<partition parameters>)]
              [WHERE <limits>];
```

For example, the following query may return the parameters of the "PrintValuesFrom" function in a two-column table with values "Begin" and "End" in one column and the value "Int" (for integer) in both rows of the other column.
LIST PARAMETERS FOR PrintValuesFrom;

The query language may support a LIST SECONDARIES directive, which may return all the secondary values that are common for a list of tags provided, or for all tags if no tag list is provided. This directive may return a single-column table with the names of the attributes. The syntax for this directive may be as follows:

```
          LIST SECONDARIES
              [FOR {<mask> | <tag list₂>}]
              [PARTITIONS(<partition parameters>)]
              [WHERE <limits>];
```

For example, the following query may return the secondaries for the Tag1 tag.
LIST SECONDARIES FOR Tag1;

The query language may support a LIST TAGS directive, which may return the names and descriptions of tags in the database, tags in a specified group, or subtags within a specified tag. The syntax for this directive may be as follows.

```
          LIST TAGS
              [IN group | WITHIN tag]
              [PARTITIONS(<partition parameters>)]
              [WHERE <limits>];
```

For example, the following query may return all the tags in the Group1 group.
LIST TAGS IN Group1;
The following query may return all subtags within the Tag1 tag.
LIST TAGS WITHIN Tag1;

The query language may support a RETURN MESSAGES directive, which may return a message. The syntax for this directive may be as follows:
RETURN MESSAGES <messages>;
For example the following query may return the message "This is a friendly message" in the message section of the response.
RETURN MESSAGES INFO "This is a friendly message";

The query language may support a STORE directive, which may save data into tag database 102 under a single tag. This directive returns a single message indicating whether the directive succeeded or failed. The syntax for this directive may be as follows:

```
          STORE tag name = value [AT time]
              [INCLUDE <secondary updates>];
```

For example, the following query stores the value 120 into the LineSpeed1 tag at time Jan. 25, 2005, 4:50:30 to 5:00:00, and also stores the value "This is a friendly note" in a secondary Note.

STORE LineSpeed1 = 120 AT '2005-01-25T04:50:30-5:00' INCLUDE Note = "This is a friendly note";

In one embodiment, a time value may be a key associated with a data value in tag database 102. For example, tag database 102 may store a time value associated with each tag in every table by default. Also, as illustrated in the examples above, user 107 may input specific time values associated with a particular tag being stored.

The query language may support multiple command executions in one line of text. For example, agent 103 may ignore white space (except within a string) including next-line (or return) characters such that, for example, two separate execution commands, which would usually be written in separate lines, may be included in one line together.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable storage media, including secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for querying a tag database, comprising:
   storing the tag database in a storage device;
   receiving an XML document including a database query written in a query language supported by an agent of the tag database, the query language supporting database features, tag features, and text features, the database query including a request for at least one feature of the query language that is supported by the agent;
   parsing the XML document to extract the database query from the XML document;
   accessing, using a processor, the tag database to perform at least one of a read or write operation on the tag database, based on the database query; and
   in response to receipt of the database query, returning a list of features, the list of features indicating the features of the query language that are supported by the agent,
   wherein the tag features include tag query language directives, the tag query language directives including at least one of retrieve, aggregate, call, partition, continue, list, override, or return.

2. The method of claim 1, further comprising:
   storing time data in association with a tag in the tag database.

3. The method of claim 1, wherein the database query includes a mask.

4. The method of claim 1, further comprising:
   determining a size of a result of the database query; and
   sending only a fragment of the result equal or smaller in size than a threshold size.

5. The method of claim 4, wherein the database query includes the threshold size.

6. The method of claim 1, further comprising:
   displaying a result of the database query to a user using one of a current view, a historical view, and an interpolated view.

7. A system for querying a tag database, comprising:
   a storage device configured to store the tag database; and
   a processor configured to execute an agent for:
   receiving an XML document including a database query written in a query language supported by the agent, the query language supporting database features, tag features, and text features, the database query including a request for at least one feature of the query language that is supported by the agent;
   parsing the XML document to extract the database query from the XML document;
   accessing the tag database to perform at least one of a read or write operation on the tag database, based on the database query; and
   in response to receipt of the database query, returning a list of features, the list of features indicating the features of the query language that are supported by the agent,
   wherein the tag features include tag query language directives, the tag query language directives including at least one of retrieve, aggregate, call, partition, continue, list, override, or return.

8. The system of claim 7, wherein the agent stores time data in association with a tag in the tag database.

9. The system of claim 7, wherein the database query includes a mask.

10. The system of claim 7, wherein the agent:
    determines a size of a result of the database query; and
    sends only a fragment of the result equal or smaller in size than a threshold size.

11. The system of claim 10, wherein the database query includes the threshold size.

12. The system of claim 7, further comprising:
    a display for displaying a result of the database query to a user using one of a current view, a historical view, and an interpolated view.

13. A computer-readable storage medium including instructions executed by a processor for implementing a method for querying a tag database, the method comprising:
    storing the tag database in a storage device;
    receiving an XML document including a database query written in a query language supported by an agent of the tag database, the query language supporting database features, tag features, and text features, the database query including a request for at least one feature of the query language that is supported by the agent;

parsing the XML document to extract the database query from the XML document;

accessing, using the processor, the tag database to perform at least one of a read or write operation on the tag database, based on the database query; and in response to receipt of the database query, returning a list of features, the list of features indicating the features of the query language that are supported by the agent, wherein the tag features include tag query language directives, the tag query language directives including at least one of retrieve, aggregate, call, partition, continue, list, override, or return.

14. The computer-readable storage medium of claim 13, wherein the method further includes:

storing time data in association with a tag in the tag database.

15. The computer-readable storage medium of claim 13, wherein the database query includes a mask.

16. The computer-readable storage medium of claim 13, wherein the method further includes:

determining a size of a result of the database query; and sending only a fragment of the result equal or smaller in size than a threshold size.

17. The computer-readable storage medium of claim 16, wherein the database query includes the threshold size.

18. A computer-implemented method for querying a tag database, comprising:

storing the tag database in a storage device;

receiving an XML document including a database query written in a query language supported by an agent of the tag database, the database query including a first directive configured to override a default of a second directive for a predetermined duration;

parsing the XML document to extract the database query from the XML document;

determining a new default of the second directive for the predetermined duration; and accessing, using a processor, the tag database, using the new default, to perform at least one of a read or write operation on the tag database, based on the database query, for the predetermined duration.

19. The method of claim 18, wherein the tag features include tag query language directives, the tag query language directives including at least one of retrieve, aggregate, call, partition, continue, list, override, or return.

* * * * *